Sept. 12, 1933.  H. G. WEINLAND  1,926,470
GRINDING MACHINE
Filed Nov. 30, 1931  3 Sheets-Sheet 3
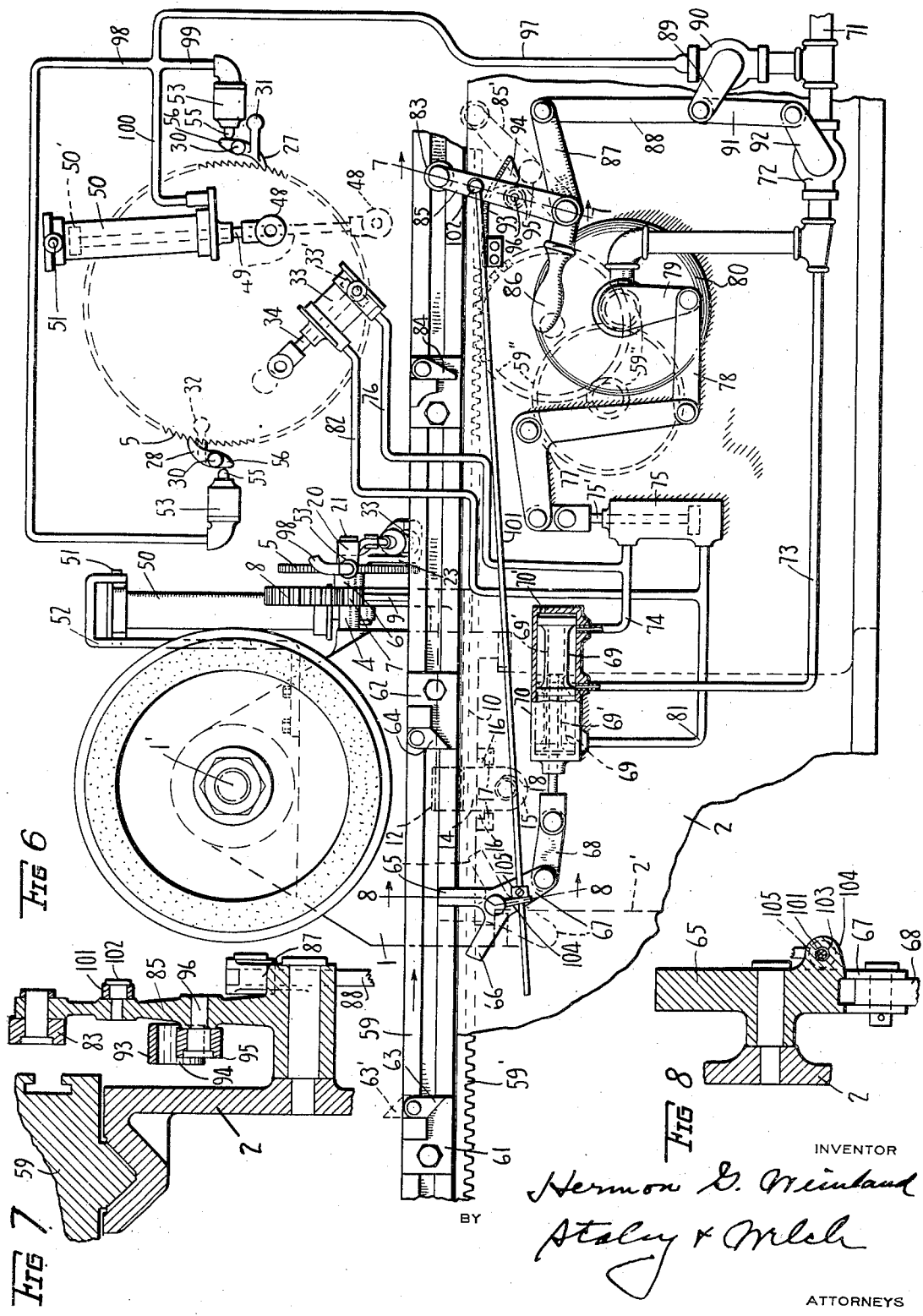
INVENTOR
Herman G. Weinland
BY Staley & Welch
ATTORNEYS Patented Sept. 12, 1933

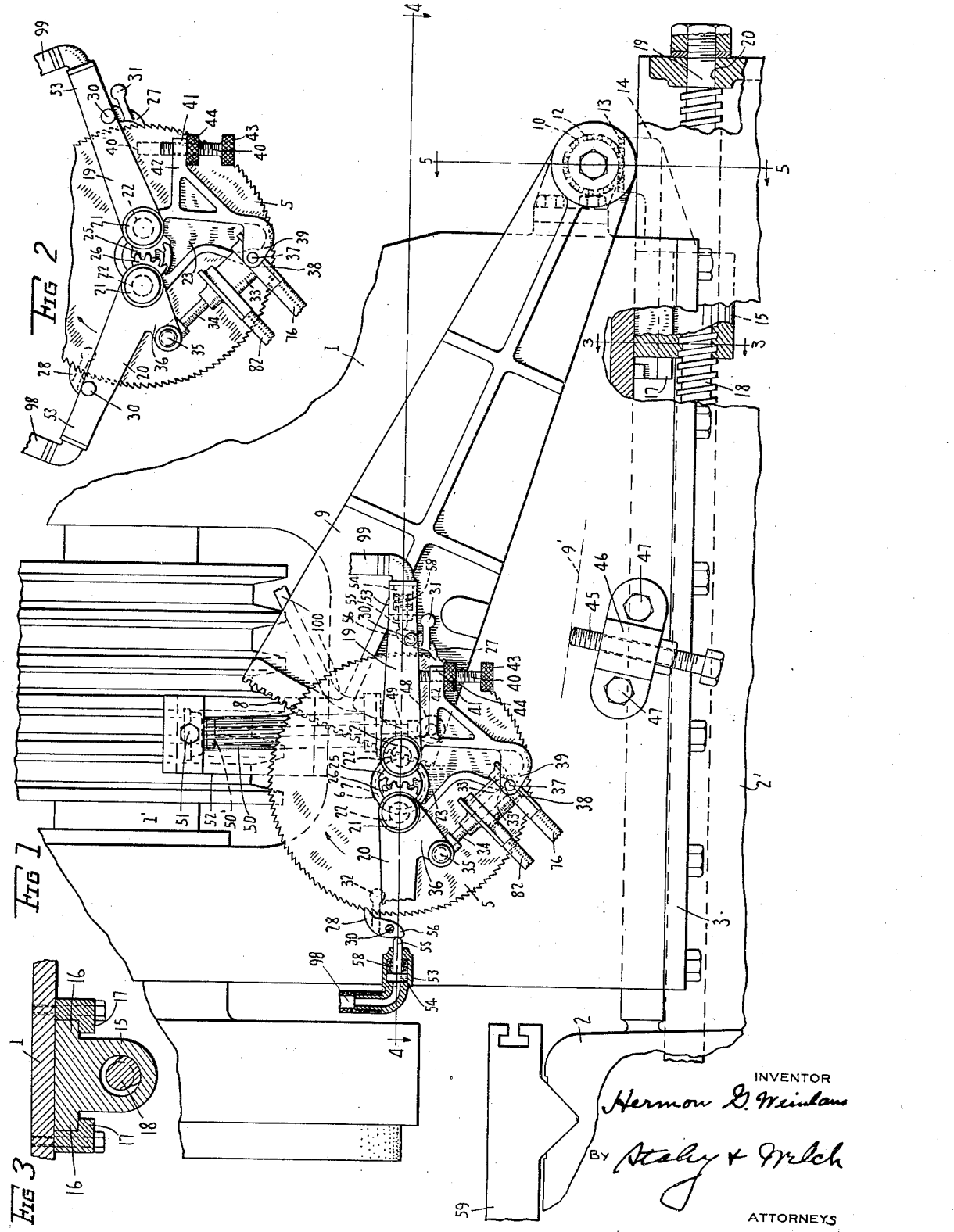

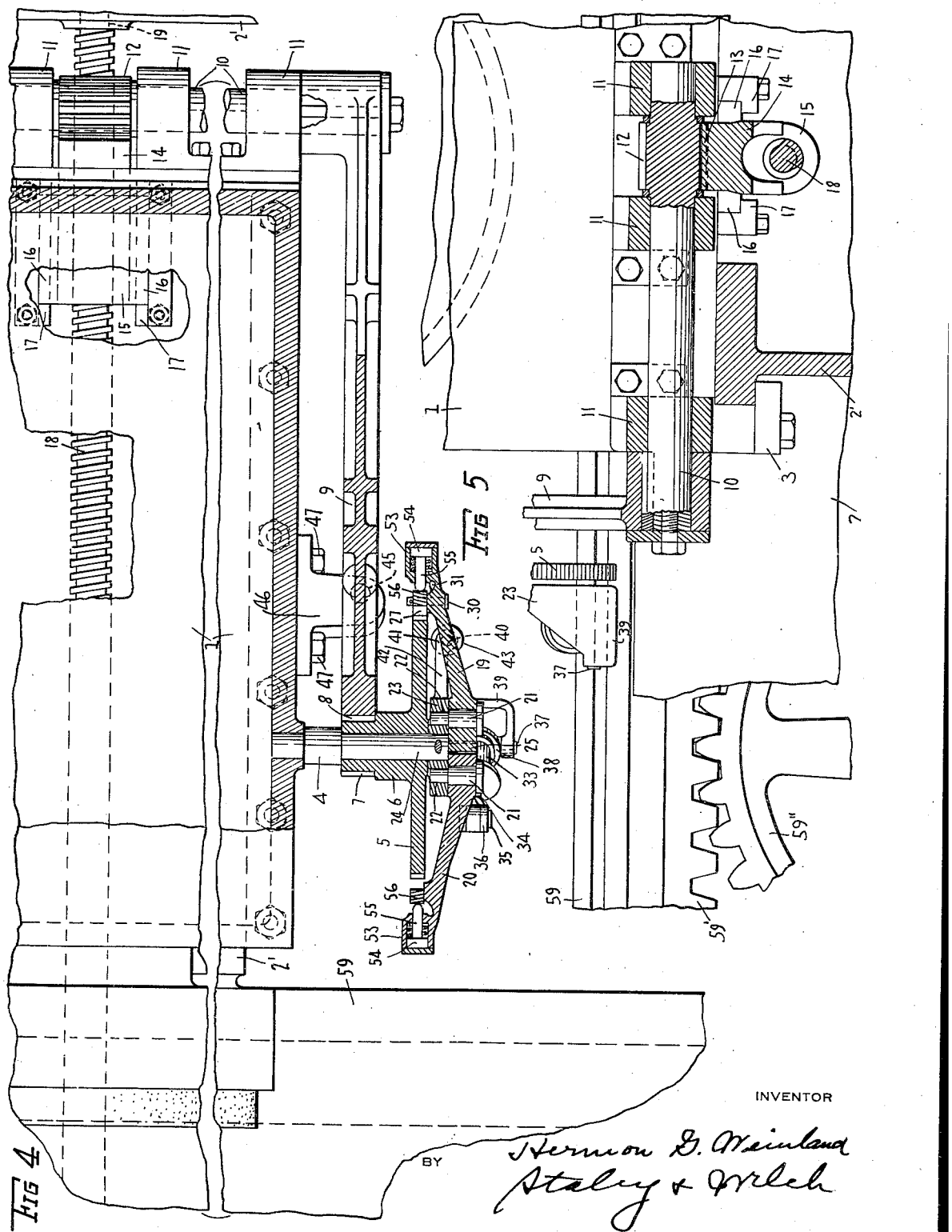

1,926,470

UNITED STATES PATENT OFFICE 1,926,470

GRINDING MACHINE

Hermon G. Weinland, Springfield, Ohio, assignor to The Safety Grinding Wheel & Machine Company, Springfield, Ohio, a corporation of Ohio Application November 30, 1931
Serial No. 577,903

14 Claims. (Cl. 51—122)

This invention relates to grinding machines and relates particularly to that type of machine in which is comprised a rapidly reciprocating work-table or holder upon which the work is mounted in combination with a grinding head supporting a grinding wheel which is movable to and from the work.

It has been found that in moving the work past the wheel at very high speed, better finish and faster cutting is obtained and at the same time less power is used. This, however, is predicated upon the principle of advancing the wheel to the work in very fine increments rather than in heavy increments which would require the table to run slower, as with the high table speed and small increment feed less heat is produced and consequent distortion of the work due to heat is reduced. This is accomplished by providing means for securing a quick setting for the grinding wheel holder in relation to the work to be ground and superimposing on this quick setting means devices for imparting a small amount of feed to the holder which is an integration of many small increments.

One of the objects of this invention is to provide means for preliminarily positioning the tool holder at an initial starting point in connection with means for thereafter imparting increment feeds to said tool-holder from the initial position to a predetermined position in relation to the work; a more specific object in this connection being to provide means for automatically arresting a tool holder after a predetermined feed, and to provide means for automatically restoring the tool-holder to initial position at the end of the predetermined movement thereof, and to also provide means for regulating the extent of the increment or intermittent feeds of the holder.

Another object of the invention is to provide means whereby forward feeding movements of the tool-holder may be arrested by adjustable stop means so that succeeding pieces of work are machined to very close tolerances; a more specific object in this connection being to locate such stop means at a point near the source of power for actuating the train of gearing employed in the present case, thereby insuring that the desired close tolerances are maintained in the machining operation, because of the fact that a small portion only of the feeding mechanism is stressed at the time of contact of the stop means.

Another object of the invention is to provide that the tool-holder may be moved quickly in either direction by manually operated mechanism without interference with the power mechanism.

Another object of the invention is to provide means for reversing the direction of movement of the work-holder during the grinding operation of such a nature as will permit the work-holder to be moved from its working position to a loading position and to provide means operated by the work-holder at the limit of its movement to loading position for automatically stopping the movement thereof, and to also permit the work-holder after loading to be again moved quickly to working position.

A further object of the invention is to provide for automatically arresting the intermittent feed of the tool-holder at the end of the movement of the work-holder to loading position.

A further object of the invention is to provide means whereby the movement of the table to its loading position acts in returning the tool-holder by a continuous movement to its initial position and to place the feeding mechanism for the tool-holder in position to again impart an intermittent forward feed to the tool holder; a further object in this connection being to provide manually-operated means to permit the operator to accomplish these results at any time desired by the proper manipulation of the control lever.

Another object of my invention is to improve the means for imparting the intermittent feed to the tool-holder; a more specific object in this connection being to provide fluid-operated mechanism in connection with comparatively high leverage ratio, thus permitting the use of a small fluid pressure device and making it possible to impart small feeding movements to the tool-holder in a more efficient way.

A further object of my invention is to provide a reciprocating work-table operated by a fluid motor and an intermittently operated work-holder also operated by a fluid motor in connection with means for supplying fluid to such motors from a common source and for controlling such source; a further object in this connection being to also provide an additional fluid motor to restore the tool-holder to initial position in connection with means for supplying fluid to such motor when the fluid to the other motors is cut off.

In the accompanying drawings:

Fig. 1 is a side elevation of a portion of a tool-holder and base showing the manner of embodying that part of the principles of the invention used therewith.

Fig. 2 is a view in side elevation of portions of the mechanism seen in Fig. 1, but with the parts in a different working position.

Fig. 3 is a vertical section on the line 3—3 of Fig. 1.

Fig. 4 is a fragmentary horizontal section on the line 4—4 of Fig. 1.

Fig. 5 is a fragmentary vertical section on the line 5—5 of Fig. 1.

Fig. 6 is a diagrammatic view showing conventionally the means whereby the principles of the invention are obtained by the use of fluid operated devices.

Figs. 7 and 8 are enlarged fragmentary transverse sections on the lines 7—7 and 8—8, respectively of Fig. 6.

Referring to the drawings, 1 represents a toolhead in which may be mounted a grinding wheel spindle 1'.

The tool-holder or head is shown slidably mounted on the upper surfaces of a lateral extension 2' of a base 2 and gibbed thereto by gibs 3. Means are provided for initially quickly positioning the tool in working relation with the piece of work to be ground and for thereafter imparting an increment or intermittent feed to the holder. In the side of the head is fixed a horizontally disposed stud 4 (Fig. 4) on which is rotatably mounted a ratchet disc 5, on the outer end of the hub 6 of which is provided gear teeth 7 meshing with which are the gear teeth 8 in the periphery of a segment arm 9. The segment arm 9 is keyed, or otherwise secured, to the extremity of horizontally disposed shaft 10 rotatably supported in bearings 11 attached to the rear side of the head 1. A portion of the shaft 10 is provided with gear teeth 12 to form a pinion which meshes with a short rack 13 secured to an extension 14 integrally attached to a nut 15.

The nut 15 is slidably mounted on the under side of the head 1 as seen best in Fig. 3, having projecting portions 16 arranged for the accommodation of gibs 17 of angle cross-section which are secured to the under side of the head 1. The lower portion of the nut 15 is interiorly threaded to receive a feed screw 18, the rearward end of which has a reduced diameter portion 19 capable of being rotatably mounted in an opening 20 in a rear wall of the base 2' in the usual manner.

The ratchet disc 5 is actuated by a pair of oppositely positioned levers having pawls, 19 being a lever on one side and 20 a lever on the opposite side of the center of the disc, which levers are rotatably mounted on short studs 21, each of which is fitted in diametrically positioned openings 22 in a bracket 23 secured in any suitable manner to the extremity 24 of the stud 4. Each of the levers 19 and 20 is provided with a segment of gear teeth, the segments meshing with each other as indicated at 25 and 26, Fig. 1, so that power applied to one lever is transmitted to its mating lever. Each of the levers is equipped with a pawl; 27 being a pawl attached to the lever 19, and 28 being that pawl attached to the lever 20.

Each of the pawls 27 and 28 is rotatably carried on a stud such as 30, one end of which is fixed in suitable apertures in each of the levers. The normal position of the levers is as seen in Fig. 1 in which they are diametrically opposite one another. The pawls, however, are positioned in a manner to impart rotation of the ratchet disc in but one direction only. Accordingly the pawl 27 depends from the lever 19 and is caused to engage the teeth by the influence of a pawl weight 31, and the pawl 28 is placed upwardly and is caused to engage the ratchet teeth by reason of the pawl weight 32. The actuation of the levers 19 and 20 from the position shown in Fig. 1 to a position such as shown in Fig. 2 will cause a partial rotation of the ratchet disc 5 in the direction of the arrow shown thereon by reason of the engagement of the pawl 28 with the disc, since by reason of the intermeshing of the gear segments 25 and 26 on the hubs of the levers, the lever 19 is given a like partial rotation on its stud 21, during which time the pawl 27 is ratcheting back over the ratchet teeth of the disc. On the return of the levers 19 and 20 from the position shown in Fig. 2 to that shown in Fig. 1, the ratchet disc 5 is again given an equal partial rotation in the same direction as described (Fig. 1) by reason of the engagement of the pawl 27 as just explained.

It should then be clear that rotation of the disc, through its connection of the gear teeth 7 of the ratchet disc and the teeth 8 in the segment arm, the shaft 10 will also be partially rotated and since the pinion 12 is in mesh with the rack 13 which is secured to the normally stationary nut 15, the head 1 must be moved through a certain distance, it being remembered that the feed screw 18 is incapable of longitudinal movement with respect to the base 2 and that the rack 13 should also be considered as being in a fixed position as regards the base.

When it is desired to move the head quickly, as in "setting-up", the feed-screw 18 is manually rotated which causes the nut 15 and with it the rack 13 to move along the feed-screw relatively to the base, and, although the nut is freely and slidably supported on the head, the small amount of friction developed on attempting to rotate the disc through the medium of the gearing, as is the apparent tendency, is of sufficient moment to offset this tendency, and the head is moved. Further, if desired, the head may be moved by the use of the feed screw, even while the mechanism described is at the time engaged in imparting its intermittent and successive small movements, and obviously at a much greater rate of speed.

The levers 19 and 20 are actuated in the present case by a small cylinder 33 having therein a piston shown in dotted lines at 33' whose piston rod 34 is pivotally connected by a pin 35 to a depending lug 36 integrally attached to the lower side of the lever 20 as seen in Fig. 1. This cylinder 33 is pivotally mounted, 37 being one of a pair of trunnions (one only being shown) fixed on either side of the base 38 of the cylinder and which trunnions 37 are rotatably fixed in openings in the lower extremity 39 of the bracket 23.

Fluid under pressure such as compressed air is admitted to either end of the cylinder 33. When such fluid is admitted to the lower end, the piston rod 34 moves outwardly to the limit of the cylinder and causes the arms 19 and 20 to assume the position shown in Fig. 2, and as explained before, this causes a partial rotation of the ratchet disc 5. When fluid is admitted to the upper end of the cylinder, the reverse movement takes place; that is, the piston rod 34 is retracted within the cylinder and draws the levers 19 and 20 downwardly, during which time the pawl 27 is now causing a partial rotation of the disc 5.

In the present case, this movement of the levers 19 and 20 results in the partial rotation of the disc through an angular distance represented by approximately five ratchet teeth on the upper movement and of five ratchet teeth on the downward movement and each may be assumed to represent the maximum amount of feeding movement at each reversal of the work-holder to be described. In order to reduce the amount of feeding movement, provision is made to limit the angular distance through which the arms 19 and 20 travel. To accomplish this, a stop screw 40 is arranged to make contact with the under side of the lever 19. This stop screw 40 is threaded into a boss 41 which is at the outer extremity of an extension 42 preferably integrally attached to the side of a bracket 23 and is provided with knurled head 43 and jam-nut 44 to retain the adjustment when it is secured. In the present mechanism the arms at all times reach the elevations as shown in Fig. 2 and on the downward stroke their return is subject to that distance allowed by the elevation of the screw 40. For example, if the screw is elevated or screwed upwardly to the approximate height as indicated by the dotted line 40' (Fig. 2) the downward movement of the lever arms would result in the movement of the ratchet disc to an angular distance of approximately one ratchet tooth only, which, due to the high ratio of the leverage, results in a very small movement of the head 1. It will be understood that in the application of the principles of the invention to operations other than those requiring small movements of the working-heads, that the leverage ratios may be considerably altered to provide large head movements.

After a number of work-holder reversals accompanied by these lever movements have been made, the head 1 will have been moved from the initial to the finish working position, in the present case to the left in Fig. 1, until such time as the dimensional requirements of the work have been met. At this time, the segment arm 9 will have been moved to a position shown by the dotted line 9' and to provide that on subsequent operations, the head will be moved repeatedly to this same approximate position, a stop screw 45 is employed.

This stop screw is threaded in a nut 46 which is secured by bolts 47 to the side of the head 1 in a position whereby contact with the segment arm 9 is made, whereby the arresting of the feeding movement is caused to occur at a point remote from the place where the greatest leverage occurs, which in the present case would be where the shaft 10 is geared to the rack 13, thus minimizing the effects of great torsional stress in the feeding mechanism.

To restore the tool-holder to initial position, there is attached to the segment arm 9 at some convenient location near its free end the lower end 48 of a piston rod 49 associated with a cylinder 50, (having a piston shown in dotted lines at 50'). This cylinder is approximately vertically arranged and admission of fluid such as compressed air into the lower end results in retraction of the piston rod within the cylinder with the consequent elevation of the free end of the segment arm 9. The opposite or upper end of the cylinder 50 is pivotally mounted on trunnions 51, one of which is seen, the trunnions being rotatably mounted in the sides of an inverted U-shaped bracket 52 which in the present case is attached to the head 1.

During the descent of the arm 9 therefore, the piston rod 49 is withdrawn from within the cylinder 50 and an application of compressed air in the lower end of the cylinder 50 will result in parts re-assuming the position as shown in Fig. 1.

However, as it is not possible to cause the parts to reassume their initial positions without disengaging the pawls from the ratchet teeth of the disc 5, provision is made to disengage the pawls from the ratchet teeth at the same instant that fluid pressure is admitted to the lower end of the cylinder 50. Each of the pawls is disengaged by means of a small fluid cylinder 53 positioned in the outer end of each of the arms 19 and 20, which fluid cylinders receive a portion of the compressed air applied to the cylinder 50 and therefore act about the same time. Each of these small fluid cylinders 53 has a piston 54 having a piston rod 55. The outer ends of the piston rods 55 bear upon the tail 56 of each of pawls 27 and 28, and upon application of fluid under pressure in the cylinders 53, causes the pistons 54 to move towards the pawls and disengage the pawls from the teeth of the disc. Upon reduction of the pressure small springs 58, one each being employed in each cylinder 53, force the pistons inwardly and allow the pawls to re-engage the teeth through the influence of the pawl weights 31 and 32.

The work-holder, which is in the form of a table, is shown in Fig. 6, and indicated at 59, this work-table being slidably mounted upon the base 2 of the machine. Provision is made for reciprocating the work-table from a rotary fluid motor 80, the table being provided with a rack 59' which is connected with the shaft of the motor through a train of gearing 59''. To automatically reverse the direction of travel of the table at the end of each movement thereof in either direction, the table is provided with a pair of adjustable dog-holders 61 and 62 upon which are mounted pivoted dogs 63 and 64, these dogs being for the purpose of reversing the valve of the motor, this being accomplished in the following manner. A Y-shaped lever is pivotally mounted on the forward wall of the base, the normal position of which is such that one of the arms 65 or 66 thereof stands in a vertical position and is acted upon by one or the other of the dogs 63 or 64. The third arm 67 of this lever is connected by a link 68 to a piston valve 69 in a fluid pressure cylinder 70, one end of the cylinder having an exhaust port 70' and the valve an exhaust passage 69'. The ends of the cylinder 70 are connected with the respective ends of a cylinder 75 by the pipes 74 and 81. The piston rod 75' of the cylinder 75 is linked to one arm of a bell-crank lever 77, the other arm of which is connected through a link 78 to the lever 79 of the motor reverse valve, with which connects the fluid supply pipe 71 equipped with a control valve 72. The cylinder 75 is supplied with fluid through a pipe 73 which leads to the cylinder 70 and thence through the pipes 74 and 81 previously referred to, which alternately act to supply fluid to one end of the cylinder and exhaust it from the other end.

Assuming that the table is moving in the direction of the arrow shown in Fig. 6 when the dog 63 strikes the arm 65, the direction of the motor 80 is reversed through the devices described. This throws the arms of the lever to the position shown in dotted lines, positioning the arm 66 vertically so that upon the reverse movement of the table, it will be operated by the dog 64 to again reverse the motor 80.

The motor 33 which operates the tool-holder is supplied with fluid through pipes 76 and 82 which also act as exhaust pipes to exhaust the fluid through the exhaust port 70'. The flow of fluid to either end of the cylinder 33 will cause a movement of the levers 19 and 20 and result in a partial movement of the ratchet disc 5 under the action of the pawl 27 or pawl 28.

Thus for every reversal of movement for the table there will be an upward or downward swinging movement of the levers 19 and 20 and each pawl will alternately engage the ratchet disc 5 to intermittently and successively rotate the ratchet disc to move the tool-holder towards the work.

At the conclusion of the working operation, the arrest of the feeding movement being occasioned by the contact of the segment arm 9 with the stop screw 45, one of the swinging contact members, in the present case 63, may be turned upwardly as shown by the broken line 63' which will allow the table 59 to continue its travel to the right beyond the proximity of the arm 65 of the Y-lever in order to proceed to the loading position. The table is stopped at the loading position by contact of a roller 83 arranged to stand in the path of an inclined contact surface 84 of an auxiliary table-stop. The roller 83 is mounted at the free end of the lever 85 which is pivotally mounted on the base and has a hand lever 86 attached thereto for the purposes of manual control. To the lever 85 is also attached the lever 87 which is connected by a link 88 to the lever 89 of a valve 90, which is in a normally closed position during the working operation, and also by a link 91 to the lever 92 of the valve 72 which is in a normally open position during the working operation.

The effect of the contact of the auxiliary stop 84 on the roller 83 is to cause a downward movement of the lever 85 to the approximate position as shown by the broken line 85' which will partly open the valve 90, and partly close the valve 72; but in order to leave proper clearance between the lever 85 and the inclined surface 84 to again reverse the valve manually, there is provided additional means to move the lever a further distance to complete the closing of the valve 72 and the opening of the valve 90.

The character 93 indicates a flat curved spring secured to the base; at its free end is secured a wedge-shaped member 94 arranged to stand in the path of a roller 95 rotatably mounted on a stud 96 secured in the lever 85. As the lever 85 is moved downwardly the roller 95 bears against the wedge 94. At approximately the time the roller rides under the point of the wedge the valves are partially open or closed and vice versa; the remainder of the travel of the lever 85 under the influence of the opposite side of the wedge 94 being utilized for the purpose of providing ample clearance space between the roller 83 and the inclined contact surface 84, for the purpose explained. The action of the wedge is such as to impart a quick movement to the lever causing the roller 83 to leave the incline 84 and to quickly close the valve 72 to stop further movement of the work-table, and completely open the valve 90.

The opening of the valve 90 causes a flow of compressed air through the pipe 97 and through the branches leading therefrom indicated at 98, 99 and 100. The flexible branches 98 and 99 lead to the cylinders 53 previously described as being fixed in the ends of the levers 19 and 20, while the pipe 100 leads to the cylinder 50, there therefore being the desired simultaneous application of fluid pressure to each of the cylinders mentioned, to withdraw the pawls 27 and 28 and restore the arm 9 to initial position.

After the new piece of work has been placed on the table in proper position, the machine is put into operation by manually depressing the handle 86. During the first portion of the downward movement of the handle 86, the roller 83 moves through the clearance space and before contact is made by the roller 83 with the contact surface 84, the valves 72 and 90 are put in their partial open and closed positions, respectively, after which the spring-and-wedge action previously described restores the levers to the initial position as soon as the table moves from the loading position, and completes the movement of the valves.

To move the work-table from loading position to working position, it is necessary to shift the table reversing mechanism to shift the reverse valve 69. This shifting of the valve is caused during the first portion of the downward movement of the handle 86, through the medium of the following described connection; at 101 is indicated a rod pivotally connected to the lever 85 by means of the stud 102. This rod has a connection with the Y-lever and causes a movement of the Y-lever in one direction only, it being loosely inserted through an opening 103 in an integrally attached rib 104 on the forward side of the lever 67. A collar 105 on this rod is adjustably secured thereto in such position that when the handle 86 is depressed, the collar will bear against the rib 104 and cause the desired shift of the reverse valve 69 but with no interference with the necessary movements of the Y-lever. On the return of the table to the working position, the swinging stop member 63, which should be restored to its proper position immediately after it passes the Y-lever, swings over the arm 66, the arm 66 at this time being in the vertical position. Although not shown, a variation of the spring-and-wedge arrangement similar to that described for the lever 85, may be employed in connection with the table reverse Y-lever.

Having thus described my invention, I claim:

1. In a grinding machine, a work-holder, a fluid motor for reciprocating said work-holder, a movable tool-holder, means including a fluid motor for imparting an intermittent feed to said tool-holder, a valve means for reversing each of said motors, means on the table for controlling said valve means, a third fluid motor for restoring said tool-holder to initial position and means on the table for simultaneously supplying fluid to said third motor and for cutting off the fluid to said first mentioned motors.

2. In a grinding machine, a reciprocating work-holder having a movement from working to loading position, a movable tool-holder, means including a fluid motor and a pawl and ratchet device for imparting an intermittent feed to said tool-holder, another fluid motor for restoring said tool-holder to initial position, fluid-operated means for rendering the pawl and ratchet device inoperative, and means operated by a movement of the work-holder from working to loading position for controlling said fluid motors to stop the first mentioned motor and supply fluid to the last mentioned motor.

3. In a grinding machine, a reciprocating work-holder having a movement from working to loading position, a movable tool-holder, means including a fluid motor and a ratchet wheel and a pair of pawls for imparting an intermittent feed to said tool-holder, another fluid motor for restoring said tool-holder to initial position, a fluid motor for each pawl for throwing same out of engagement with said ratchet-wheel, and means operated by a movement of the work-holder from working to loading position for controlling said fluid motors to stop the first mentioned motor and supply fluid to the motor for restoring the tool-holder and the motors for releasing the pawls.

4. In a grinding machine, a movable tool-holder, means including a fluid motor and a ratchet-wheel and a pair of pawls for imparting an intermittent feed to said tool-holder, another fluid motor for restoring said tool-holder to initial position, and means for controlling said fluid motors to cut off fluid to the first mentioned motor and supply fluid to the second mentioned motor to also release the pawls from said ratchet-wheel.

5. In a grinding machine, a base, a tool-holder movably mounted thereon, a pivoted arm on said holder, means for gearing the pivoted end of said arm to a normally fixed part on said base, a segmental gear on the free end of said arm, a shaft carried by said holder, a ratchet-wheel rotatable with said shaft, a pinion connected with said ratchet-wheel meshing with said segmental gear, a pair of pawl-arms geared together for simultaneous movement, a pawl on each arm meshing with said ratchet-wheel in reverse relation with each other, a reciprocating fluid motor connected with one of said arms, and means for alternately supplying fluid under pressure to the ends of the cylinder of said motor.

6. In a grinding machine, a movable tool-holder, means including a fluid motor for imparting an intermittent feed to said tool-holder, adjustable means for regulating the extent of each intermittent feed and adjustable means cooperating with an intermediate portion of said feeding means for stopping the feed at the end of a predetermined movement of said holder.

7. In a grinding machine, a movable tool-holder, and a base upon which same is movably mounted, means including a fluid motor and a lever fulcrumed upon said holder and geared to a normally fixed part adjacent the fulcrum point thereof for imparting an intermittent feed to said holder, adjustable means for regulating the extent of each intermittent feed of said feeding means, and adjustable means cooperating with said feeding means at a point intermediate the fulcrum of said lever and said motor for stopping said feeding means after a predetermined movement of said holder.

8. In a grinding machine, a base, a movable tool-holder thereon, means including a fluid motor and a lever fulcrumed upon said holder and geared to a normally fixed part adjacent the fulcrum point thereof for imparting an intermittent feed to said holder, adjustable means for regulating the extent of each intermittent feed, and adjustable means cooperating with said lever at a point remote from the fulcrum thereof for stopping the feeding means after a predetermined movement of said holder.

9. In a grinding machine, a reciprocating work-holder, a rotary fluid motor geared thereto, a reciprocating fluid pressure cylinder for operating the reversing valve of said rotary motor, a valve for controlling the fluid supply to and exhaust from said reciprocating motor, a lever connected with said valves having a pair of arms, and a pair of pivoted dogs on said work-holder cooperating with said arms to reverse said valve at the end of each reciprocatory movement of said work-holder.

10. In a grinding machine, a reciprocating work-holder, a rotary fluid motor geared thereto, means operated by the holder for reversing said motor at the end of each reciprocatory movement of said holder, said means at one of the movements of said work-holder being adapted to be rendered inoperative to cause said motor to move said work-holder to loading position, and means operated by said holder for shutting off the fluid supply to said motor at the end of its movement to loading position.

11. In a grinding machine, a reciprocating work-holder, a movable tool-holder, a rotary fluid motor geared to said work-holder, means for imparting an intermittent feed to said tool-holder including a fluid-operated motor, means operated by the holder for reversing said rotary motor at the end of each reciprocatory movement of said holder, said means at one of the movements of said work-holder being adapted to be rendered inoperative to cause said motor to move said work-holder to loading position, and means operated by said holder for shutting off the fluid supply to both of said motors at the end of movement of said holder to loading position.

12. In a grinding machine, a reciprocating work-holder, a movable tool-holder, a fluid motor geared to said work-holder, means for imparting an intermittent feed to said tool-holder including a fluid-operated motor, a fluid-operated motor to restore said tool-holder to initial position, means operated by the work-holder for reversing its motor at the end of each reciprocatory movement of said work-holder, said means at one of the movements of said work-holder being adapted to be rendered inoperative to cause said motor to move said work-holder to loading position, and means operated by said holder for shutting off the fluid supply to said rotary motor and to the motor of the intermittent feeding means and for furnishing a fluid supply to said restoring motor at the end of the movement of said holder to loading position.

13. In a grinding machine, a reciprocating work-holder, a movable tool-holder, a fluid motor geared to said work-holder, means for imparting an intermittent feed to said tool-holder including a fluid-operated motor, a fluid-operated motor to restore said tool-holder to initial position, means operated by the work-holder to reverse its motor at the end of each reciprocatory movement of said work-holder, said means at one of the movements of said work-holder being adapted to be rendered inoperative to cause said motor to move said work-holder to loading position, valves and connections for controlling the fluid supply to said motors, a lever connected with said valves, and a member on said work-holder for causing said lever to be moved near the end of the movement of said work-holder to loading position to shut off the fluid to said work-holder motor and said intermittent feed motor and to supply fluid to said restoring motor.

14. In a grinding machine, a reciprocating work-holder, a movable tool-holder, a fluid motor geared to said work-holder, means for imparting an intermittent feed to said tool-holder including a fluid-operated motor, a fluid-operated motor to restore said tool-holder to initial position, means operated by the work-holder to reverse its motor at the end of each reciprocatory movement of said work-holder, said means at one of the movements of said work-holder being adapted to be rendered inoperative to cause said motor to move said work-holder to loading position, valves and connections for controlling the fluid supply to said motors, a lever connected with said valves, and means on said work-holder for imparting an initial movement to said lever near the end of the movement of said work-holder to the loading position, and additional means for completing the movement of said lever, whereby the fluid to said work-holder motor and said intermittent feed motor is shut off and fluid supplied to said restoring motor.

HERMON G. WEINLAND.